April 7, 1970  R. S. BABINGTON ET AL  3,504,859
SPINNER-TYPE SPRAY DEVICE
Filed Sept. 14, 1967  2 Sheets-Sheet 1
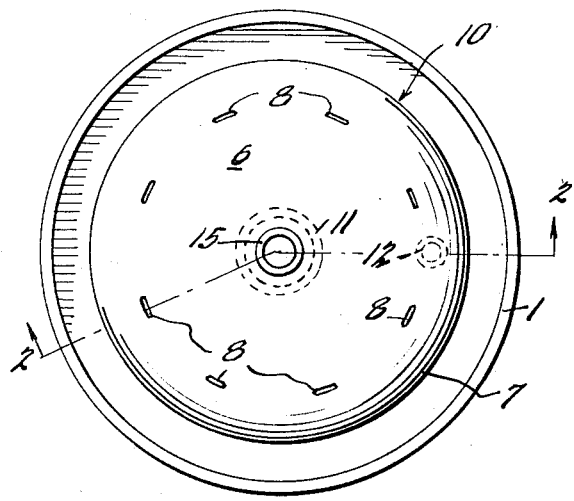
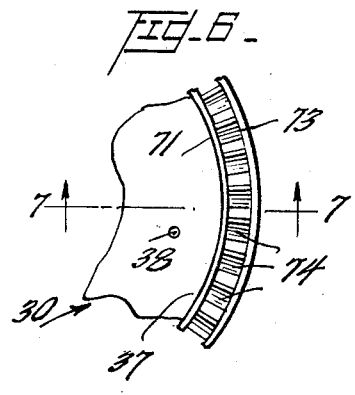
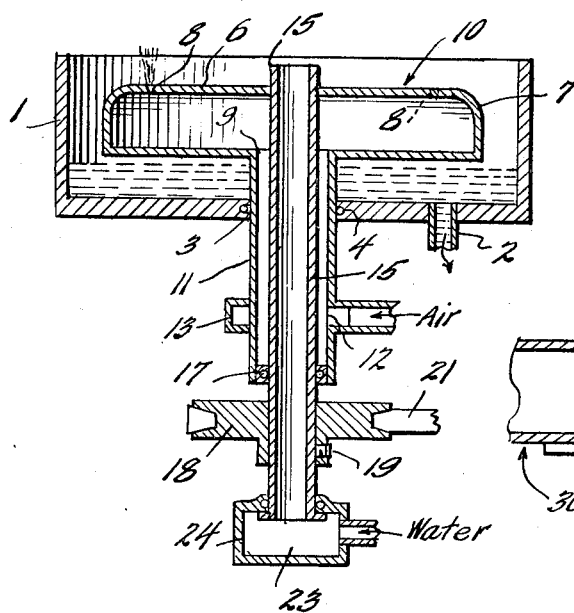
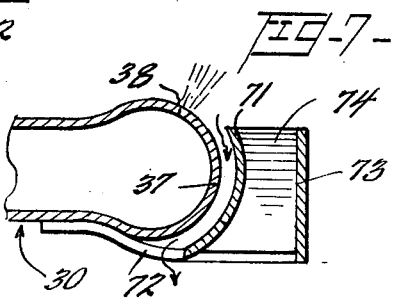
INVENTORS
Robert S. Babington
Albert A. Yetman,
BY Smith, Michael, Bradford
and Gardiner
ATTORNEYS

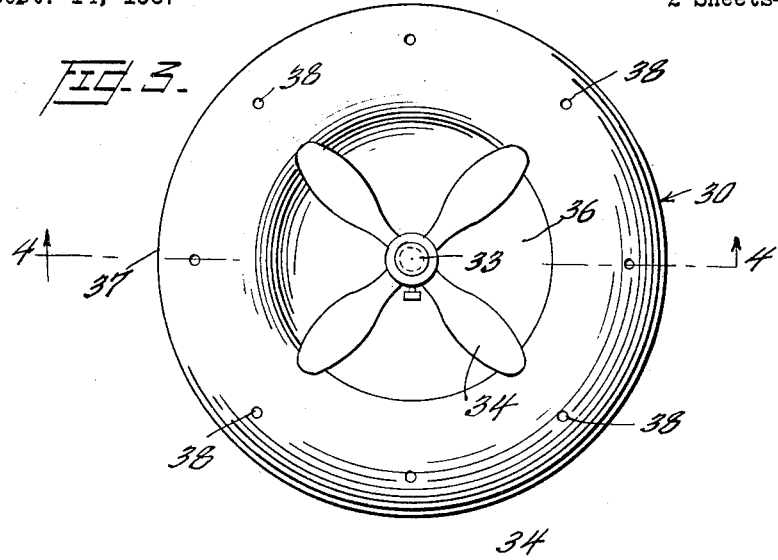
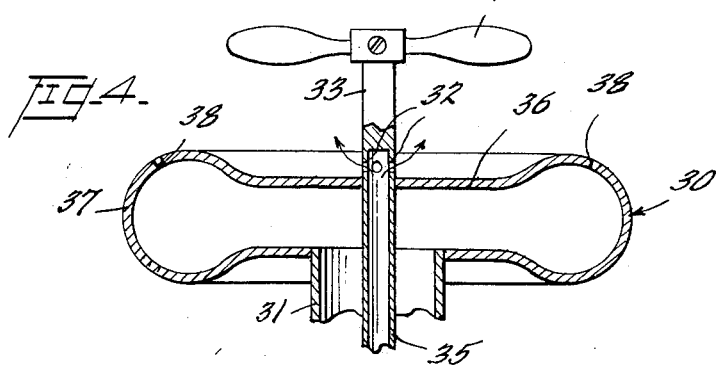
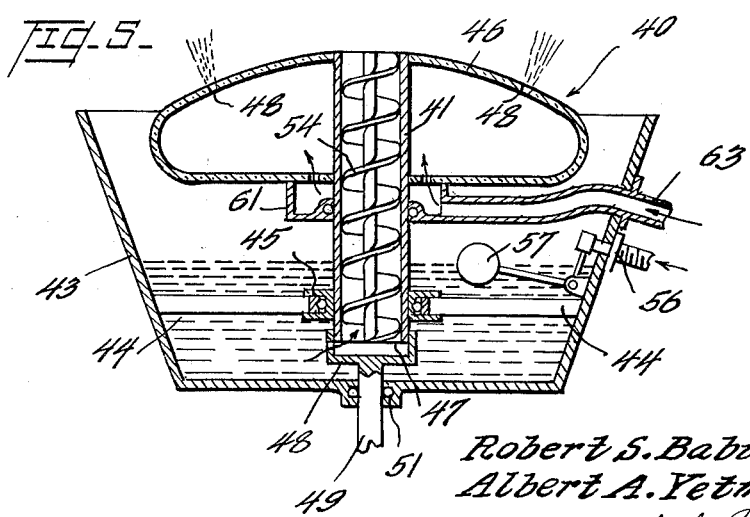

United States Patent Office 3,504,859
Patented Apr. 7, 1970

3,504,859
SPINNER-TYPE SPRAY DEVICE
Robert S. Babington, 1113 Ingleside Ave., McLean, Va. 22101, and Albert A. Yetman, 12316 Kembridge Drive, Bowie, Md. 20715
Filed Sept. 14, 1967, Ser. No. 667,823
Int. Cl. B05b 3/10
U.S. Cl. 239—224                                    10 Claims

ABSTRACT OF THE DISCLOSURE

The invention is directed to a fluid spraying device wherein a fluid is dispensed on a rotating surface to be acted upon by centrifugal force so as to form a thin film on the surface. Air or other gas is passed through the film to disperse spherical minuscule droplets from the film in the form of a fine spray, the droplet size being a function of the rotational speed of the surface.

The invention is directed to a device for atomizing liquids utilizing a plenum chamber of disc form, rotating the chamber at relatively low r.p.m. to cause liquid admitted to the central top surface of the disc to film out uniformly over the surface and pass down over the periphery of the disc; suitable small apertures being disposed in circumferentially spaced relation adjacent the peripheral edge of the disc permit low pressure air to lift minuscule spherical droplets of liquid from the film.

This invention is concerned with an apparatus for diffusing a liquid in a gaseous medium. More particularly, the invention is concerned with a novel apparatus for carrying out the novel method disclosed in the co-pending application of Robert S. Babington, William R. Slivka and Albert A. Yetman, filed Dec. 29, 1966, Ser. No. 605,777 now Patent 3,421,698, dated Jan. 14, 1969 and is a further improvement upon the apparatus described and claimed in companion Patent 3,421,699 issued to the same inventors on the same date as 3,421,698.

The invention is directed to an apparatus for dispersing large amounts of liquid into a gaseous medium and has utility in a variety of applications, since its use is not limited to specific gaseous or liquid mediums or any combinations thereof. Examples of its use are in humidification of air, chemical processing, spray drying, food processing, spray desalinization, metal treatment with finishing solutions, lubricants, etc., in fact the apparatus has utility in any environment wherein it is necessary and desirable to disperse a liquid in the form of minuscule particles, or expressed more definitively, where particle size and uniformity of the spray is singularly important.

Various prior art devices have been proposed in respect of reducing liquids to a spray for dispersion in a gaseous medium, be it air or whatever. Such devices range from the simple, ordinary garden hoze nozzle through very sophisticated and complex mechanical devices and air-liquid mixers as, for example, paint sprayers. While all of these devices have proved successful within inherent limits, industry, generally, is and has been diligently seeking means whereby the size of the liquid particles is rendered more and more uniform and smaller and smaller in size, in the neighborhood of 25 microns or less. As a practical matter, it may be said that efforts are continuing to develop sprays having the characteristics of natural fog, insofar as natural fog represents a uniform blanket of water particles in air. In addition, efforts have been continuing to develop spray devices incapable of clogging, spitting and other problems resulting in the necessity for regular and often expensive maintenance and cleaning.

The present invention represents a significant step forward in the art because it produces a uniquely uniform spray of minuscule liquid particles and operates in such a manner as to virtually eliminate the disadvantages, critical control parameters and maintenance problems encountered in the use of presently available equipment.

Accordingly, an object of the invention is to produce a high capacity, simple, liquid dispersion apparatus.

Another object of the invention is to produce a maintenance-free spray apparatus.

A further object of the invention is to produce a spray device capable of dispersing a liquid in the form of minuscule spherical droplets, or particles closely approaching the characteristics of a natural fog.

Still another object of the invention is to produce a simply manufactured, highly efficient spray device having complete versatility in a variety of applications.

An additional object of the invention is to produce a device for dispersing liquids wherein exact metering of the liquid is avoided and wherein spray quantity and particle size can be easily varied and controlled.

These and other objects of the invention, not specifically alluded to, but apparent to those skilled in the art, may be accomplished by means of a device comprising a hollow rotating plenum chamber adapted for rotation about a vertical of near vertical axis; means for supplying gas under pressure to the interior of the chamber, said chamber being provided with apertures opening upwardly from its upper surface, means for supplying liquid to be dispersed to the apertured surface at a point radially inwardly of the apertures in said chambers; and means for rotating said chamber about its axis.

Having described the inventive concept and structure in broad terms, consideration will now be given to the following detailed description, reference being made to the drawings, wherein FIG. 1 is a plan view of one form of the invention, FIG. 2 is a sectional, elevational view of the device shown in FIG. 1 taken along the line 2—2 of FIG. 1, FIG. 3 is a plan view of a further form of the invention, FIG. 4 is a view similar to FIG. 2 but taken along the line 4—4 of FIG. 3, FIG. 5 is an elevational view showing a further modification of the basic concept herein involved, FIG. 6 is a fragmented top plan view of a modification, and FIG. 7 is a vertical sectional view through FIG. 6 at line 7—7 therein.

Turning now to FIG. 1, it may be seen that there is provided a cylindrical, open topped receptacle 1, having a radially offset bottom opening or drain 2 and a central opening 3 provided with a combined liquid seal and bearing assembly 4 of conventional design.

Disposed within receptacle 1 is a hollow, disc-shaped plenum chamber 10 characterized in that it is provided with a flat upper surface terminating at its outer peripheral edge in a downwardly curved marginal edge 7.

Disposed at equally, angularly spaced points around the top surface 6 of the chamber 10 on a common diameter spaced inwardly of edge 7, are a plurality of apertures 8 providing access from the interior of the chamber 10 to atmosphere through the upper surface 6 thereof. These apertures may take a variety of forms, such as simple round holes, elongated slots and the like. Further, the apertures may be straight-walled or may include diverging walls which open outwardly from the interior of the chamber 10 to the surface 6. It has been found, by experimentation, that for the purposes of highest efficiency, the most preferred form for apertures 8 is that of elongated slots having walls which diverge from the interior of chamber 10 outwardly toward surface 6. By way of illustration, a slot size may be on the order of fifty thousandths of an inch in its longer dimension.

The bottom of the disc-like chamber 10 is provided with a central opening 9 which may be in the form of an elongated, downwardly-extending tube 11. As shown in FIG. 2, tube 11 passes through the bottom of receptacle 1 in aperture 3 where it is journaled, supported and sealed by means of the conventional bearing seal unit 4 so as to prevent the passage of fluid from the receptacle along the outside of tube 11 and to rotatably support chamber 10 in receptacle 1.

At its lower end, tube 11 is apertured at 12 and is surrounded in sealing engagement with a conventional slip ring 13. The ring 13 is in communication with a suitable source of air pressure, whereby air may pass from the source through the slip ring into the tube 11, to the interior of chamber 10 and thence outwardly through apertures 8. The slip ring is again an element of purely conventional design which need not be described in detail.

Disposed with the interior of tube 11 and concentric therewith is a further tube 15 having one end extending fixed to the upper surface 6 of plenum chamber 10 and a lower end disposed below the terminal end of tube 11. The tube 15, hereinafter called a liquid conduit is also sealingly fixed to the lower end of tube 11, at 17, and has mounted thereon a drive pulley 18 fixed thereon by a set screw or key 19 and driven from any suitable power source by a belt 21.

The terminal end of liquid conduit 15 is in sealed engagement with a chamber 23 which in turn is placed in communication with a source of liquid under pressure. The structure of chamber 23 is also conventional with seal and bearing unit 24 being provided so that it may remain stationary while tube 15 rotates with chamber 10.

From the preceding description, then, it is apparent that liquid admitted to the interior of tube 15 will flow up to and be dispensed on the top surface 6 of plenum 10.

Gas, on the other hand, enters tube 11 at 12 and from thence into the interior of plenum 10 wherein its emitted through the slots or apertures 8.

If, then, the entire plenum 10 is rotated by means of the belt 21 and pulley 18 at a relatively low but variable speed, it will be noted that liquid dispensed through tube 11 to the top surface of plenum 6 will be caused by centrifugal force to flow evenly out toward the periphery of the plenum and over the apertures 8. By matching rotational rate to both the viscosity of the liquid to be dispersed and also to the desired film characteristics, having in mind that for a fixed discharge rate through tube 15, the film thickness will be a function of rotational speed, the plenum will be rotated at a speed sufficient to produce a smooth, even liquid flow over the surface 6 so that the liquid flows continuously over apertures 8.

Gas admitted to the interior of plenum 10, then will discharge upwardly through the liquid film and cause minuscule droplets to be broken out of the film and carried upwardly in the form of a fog or smoke into the ambient atmosphere. It has been found that, because the film is already stressed by its flow over surface 6 and by centrifugal force, an excellent liquid dispersion can be obtained with gas pressures in the range of 6 to 10 p.s.i.g. though it should be understood that this figure may vary upwardly or downwardly depending on various factors, one being the viscosity of the liquid being dispersed.

The portion of the liquid film that is not disposed by the gas escaping from apertures 8 will continue to flow outward beyond apertures 8 due to the centrifugal force set up by the rotation of plenum 10. In so doing this excess liquid; excess in that it is not disposed from surface 6 by the gas, serves a very important function. The dynamic forces associated with the movement of the excess liquid film beyond and away from apertures 8, serve to maintain and stabilize a thin liquid film over the entire surface 6 of plenum 10. Furthermore, the contour of surface 6, the location of apertures 8, and the dynamics of the excess fluid film, insures that within the immediate vicinity of apertures 8 the film is not only thin but highly stressed. By preconditioning the liquid in this manner the highly stressed film is easily and uniformly ruptured and the energy of the escaping gas is ideally utilized to disperse the liquid. Throughout the spraying operation the highly stressed liquid film appears continuous and obviously then must be, in contact with the entire perimeter of the gas discharge apertures. It is believed that these factors of liquid preconditioning and full utilization of the entire gas flow perimeter, acting jointly together, are the unique features underlying the operativeness of the present invention. Furthermore, they are believed to be the reasons behind the fact that a highly uniform spray of minuscule liquid particles can be produced with but a small amount of low pressure gas. The basic method utilized and underlying the performance of the apparatus herein disclosed is set forth and claimed in co-pending application Ser. No. 605,777 which describes more fully this unique method of liquid dispersion.

The excess liquid film after flowing over edge 7 of chamber 10 and into receptacle 1, is drained off through opening 2. If desired the drained off liquid may be recirculated back to chamber 23 by means of a conventional liquid recirculating pump not shown.

In respect of materials, it has been found advantageous to form either the entire plenum chamber 10, or at least the upper surface 6 thereof of a material or coated surface having a low contact angle with respect to the liquid being dispersed. This is particularly helpful in attaining a fine film over surface 6, though it has been found that, if the contact angle between liquid and surface, i.e. surface tension is not ideal, variations in rotational speed of the plenum 10 may serve to spread out the liquid film to obtain the desired fog-like liquid dispersion of the liquid.

Turning now to FIGURES 3 and 4, a modified chamber and liquid feed tube arrangement is disclosed for simplicity and the disclosure will be directed to the dispersing of water into air so would be the case in a humidifier. Air is supplied to the interior of hollow chamber 30 through tube 31 in much the same manner as the arrangement shown in FIG. 2. In this apparatus the upper surface of chamber 30, in the area denoted as hub section 36, or generally flat. Rim section 37 however, is enlarged or bulbous in the vertical cross section of FIG. 4. Located on a circle which overlies or is closely adjacent the high point on the upper surface of bulbous rim 37 are a plurality of evenly spaced apertures 38 which open outwardly from the interior of chamber 30.

Liquid feed tube 35 has a closed top but contains 4 side ports 32 for a smoother radial delivery of liquid to hub surface 36. This design prevents the upward splashing of liquid that might otherwise occur if the top of tube 35 were open. By any suitable means, shaft extension or by simply extending the closed end of tube 35 upwardly, there is provided a shaft like mounting means 33 and a conventional air moving fan 34. Fan 34 is fixed to said mounting means 33 by any conventional means, set screw keyway or the like, so as to rotate with said means 33 and create a gentle flow of air upward during the entire spraying operation. This particular arrangement will be advantageous for example, in large capacity humidifiers where it is desirable to remove the super saturated air immediately above and around plenum 30 to prevent moisture from condensing on the apparatus, and wherein no other air moving means such as an exterior fan can be provided to move the fog away from the dispersing apparatus.

As would appear obvious, the integral plenum/fan design shown in FIG. 4 could also be adapted to the configuration of an apparatus shown in FIGS. 1 and 2. In an alternate approach to locating the fan 34 above the surface of either chamber 30 or chamber 10, air moving vanes could be located around the periphery of either chamber. This latter arrangement is shown in the fragmented views of FIG. 6 and FIG. 7.

As shown in FIG. 7, the periphery of the chamber is surrounded by a spaced annular wall 71 supported by suitable circumferentially spaced brackets 72 on the bottom of rotatable chamber 30. The wall 71 acts as a shield to divert excess liquid flowing over the edge of the chamber downward and prevent any centrifugal "fly off" of same. A second annular ring or wall 73 surrounds the shield ring 71 and is joined thereto by a plurality of upwardly and rearwardly inclined (as viewed in FIG. 7) vane members 74 circumferentially spaced at regular intervals completely around chamber 30 and between walls 72 and 73. Open passages are defined between vane members 74 which, when chamber 30 is rotated, thus act as an axial flow blower to accelerate the spray upward away from the apertures 38 much the same as air fan 34 acts in the structure shown in FIGS. 3 and 4.

While shown as applied to the form of plenum disclosed in FIGS. 3 and 4 it should be noted that this blower form is equally well used with any of the other plenum forms illustrated herein.

Of the various forms of devices shown in the drawings, it is believed that that shown in FIGS. 3 and 4 without the auxiliary blower or combined with the blower form of FIGS. 6 and 7 represents a preferred form of apparatus. This is because the shape of plenum 30 with its bulbous rim 37 provides for more effective and efficient stressing of the liquid film occurring as it is passed over this rim and follows its path down over rim 37.

This more efficient control of the film combined with the blower form of FIGS. 6 and 7 which itself is highly efficient produces a hightly effective spray apparatus.

Considering now FIG. 5, a further form of the invention will be described in detail. In this version, a plenum chamber 40, for example formed of glass is mushroom shaped in cross-sectional configuration having a downward curved or convex upper surface 46. Apertures 48 penetrate the surface opening of the interior of plenum 40 to the atmosphere. As before the plenum 40 is provided with a central tube 41 which has one end terminated at surface 46 and its lower end 47 disposed above the bottom of a receptacle 43. A suitable spider-like assembly of support arms 44 carry a bearing 45 in which tube 41 is journaled for rotation. Also attached to tube 41, by a yoke 48 so as to leave the end of the tube open, is a drive shaft 49 extending through the bottom of receptacle 43 and sealed against liquid leakage by seal 51 of conventional structure. Shaft 49, in turn, may be driven by any suitable prime mover, such as an electric motor or the like.

Disposed within the tube 41 is a helical, liquid-lifting conveyor 54 so arranged that as plenum 40 is rotated it will convey liquid in receptacle 43 (when said liquid level is above lower end 47 of tube 41) upward to discharge same on surface 46 of plenum 40. In order to supply liquid for this purpose, receptacle 43 is provided with a liquid admitting valve 56, controlled by float 57 such that liquid will always be supplied to the receptacle, the level of which is above and covers the lower end 47 of tube 41 so that the conveyor helix or spiral 54 may continually supply liquid to surface 46.

Air or the gaseous dispersing medium is supplied to the interior of chamber 40 by means of a stationary air connection 61 in sealing relation with respect to shaft or tube 41 as by any conventional sealing means, the connection 61 in turn being in communication with a suitable source of pressure via a tube or gas line 63 extending through the wall of receptacle 43. The gas so supplied to chamber 40 is allowed to emit through apertures 48 provided at the appropriate location slightly inboard of the periphery of the chamber 40.

Having thus described various forms which the structure may take, it will be apparent that various details of each form may be used interchangeably and that other modifications and changes will occur to those skilled in the art.

What is claimed is:

1. A liquid dispersing apparatus comprising a hollow disc-like plenum chamber having a smooth, liquid receiving film forming surface and provided with small, individual apertures at regularly spaced intervals lying on a diameter adjacent, but inboard of, the periphery of the smooth surface of said plenum chamber; means for communicating a gas under a pressure at least slightly above ambient pressure to the interior of the plenum chamber; means for supplying a liquid to be dispersed to the smooth, film forming surface of the chamber; means for rotating the chamber whereby liquid supplied to said upper surface thereof will flow thereover and be initially stressed by centrifugal force in a thin, unconfined film over the entire surface and the apertures therein so that gas passing from within said plenum chamber to atmosphere through said apertures will further stress said thin highly stressed film of liquid to disperse minuscule liquid particles from the film in the form of a spray having substantially uniform, spherical droplet size.

2. A liquid dispersing apparatus as defined in claim 1 including a blower means carried by said plenum chamber for rotation therewith said blower assisting in movement of the minuscule particles of spray away from the apparatus.

3. A liquid dispersing apparatus as defined in claim 2, wherein said blower means comprises a fan mounted above and rotatable with the plenum chamber.

4. A liquid dispersing apparatus as defined in claim 2 wherein said blower is comprised of an axial flow air pump disposed around the periphery of the plenum chamber.

5. A liquid dispersing device as claimed in claim 1, wherein the upper surface of the disc-like plenum chamber is concave adjacent said aperture.

6. A liquid dispersing device as claimed in claim 1, wherein the upper surface of the disc-like plenum chamber is flat adjacent said apertures.

7. A liquid dispersing device as claimed in claim 1, wherein the disc-like plenum chamber is provided with an axially elongated, central conduit, said conduit defining a liquid tube for conveying liquid upward to the upper surface thereof.

8. A liquid dispersing device as defined in claim 7, wherein the tube is provided with a helical series of internal ribs for conveying liquid upwardly through the tube and further including a liquid reservoir, the lower end of the tube being disposed below the liquid level of the normal contents of the reservoir.

9. A liquid dispersing device as defined in claim 7, wherein said plenum includes a further elongated axially extending conduit concentric with and surrounding said liquid conduit, said first-mentioned conduit defining a gas tube having one end in communication with the interior of said plenum and its opposite end in communication with a source of gas pressure.

10. A liquid dispersing device as defined in claim 9, including a slip ring surrounding and communicating the source of air pressure with the interior of said first-mentioned conduit, said conduit being apertured to permit passage of gas therethrough.

References Cited

UNITED STATES PATENTS

| | | | |
|---|---|---|---|
| 2,182,897 | 12/1939 | Loepsinger | 239—418 X |
| 2,467,470 | 4/1949 | Gerhold et al. | 159—4 X |
| 3,346,033 | 10/1967 | Olejniczak | 239—223 X |

M. HENSON WOOD, Jr., Primary Examiner

M. Y. MAR, Assistant Examiner

U.S. Cl. X.R.

159—4; 239—337; 261—83.